United States Patent [19]
Suzuki

[11] Patent Number: 5,907,130
[45] Date of Patent: *May 25, 1999

[54] PORTABLE INPUT/OUTPUT DEVICE

[75] Inventor: Makoto Suzuki, Nagoya, Japan

[73] Assignee: Brother Kogyo Kabushiki Kaisha, Nagoya, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/661,385

[22] Filed: Jun. 11, 1996

[30] Foreign Application Priority Data

Aug. 17, 1995 [JP] Japan ................................ 7-209684

[51] Int. Cl.$^6$ ............................ G08C 21/00; G09G 5/00; G09G 5/08
[52] U.S. Cl. ........................ 178/19.01; 178/19.03; 178/19.04; 178/19.06; 345/158; 345/169
[58] Field of Search ............................ 345/156, 158, 345/179, 169; 178/18.01, 19.01, 19.03, 19.04, 19.05, 19.06; 348/739; 340/825.69, 825.72; 341/176

[56] References Cited

U.S. PATENT DOCUMENTS

| | | | |
|---|---|---|---|
| 4,425,488 | 1/1984 | Moskin et al. | 200/220 |
| 4,786,764 | 11/1988 | Padula | 178/19 |
| 4,814,552 | 3/1989 | Stefik | 178/18 |
| 5,003,396 | 3/1991 | Kang | 455/151.1 |
| 5,045,843 | 9/1991 | Hansen | 345/158 |
| 5,202,844 | 4/1993 | Kamio et al. | 364/709.11 |
| 5,307,055 | 4/1994 | Baskin et al. | 340/825.17 |
| 5,308,936 | 5/1994 | Biggs | 178/19 |
| 5,453,758 | 9/1995 | Sato | 345/158 |
| 5,571,997 | 11/1996 | Gray | 178/18 |

FOREIGN PATENT DOCUMENTS

A-4-244881  9/1992  Japan .

Primary Examiner—Vijay Shankar
Attorney, Agent, or Firm—Oliff & Berridge, PLC

[57] ABSTRACT

An electronic pen has a body frame in a rod-like or pillar-like shape with an input mechanism and an output mechanism respectively on each end. A slope detecting mechanism changes a circuit system corresponding to the slant state of the body frame of the electronic pen, so that power is supplied from a battery to only either an input mechanism control circuit or an output mechanism control circuit. Consequently, power is supplied only to a circuit system in use. Thereby, unnecessary power consumption is prevented, and the device can be used for a long time.

25 Claims, 13 Drawing Sheets

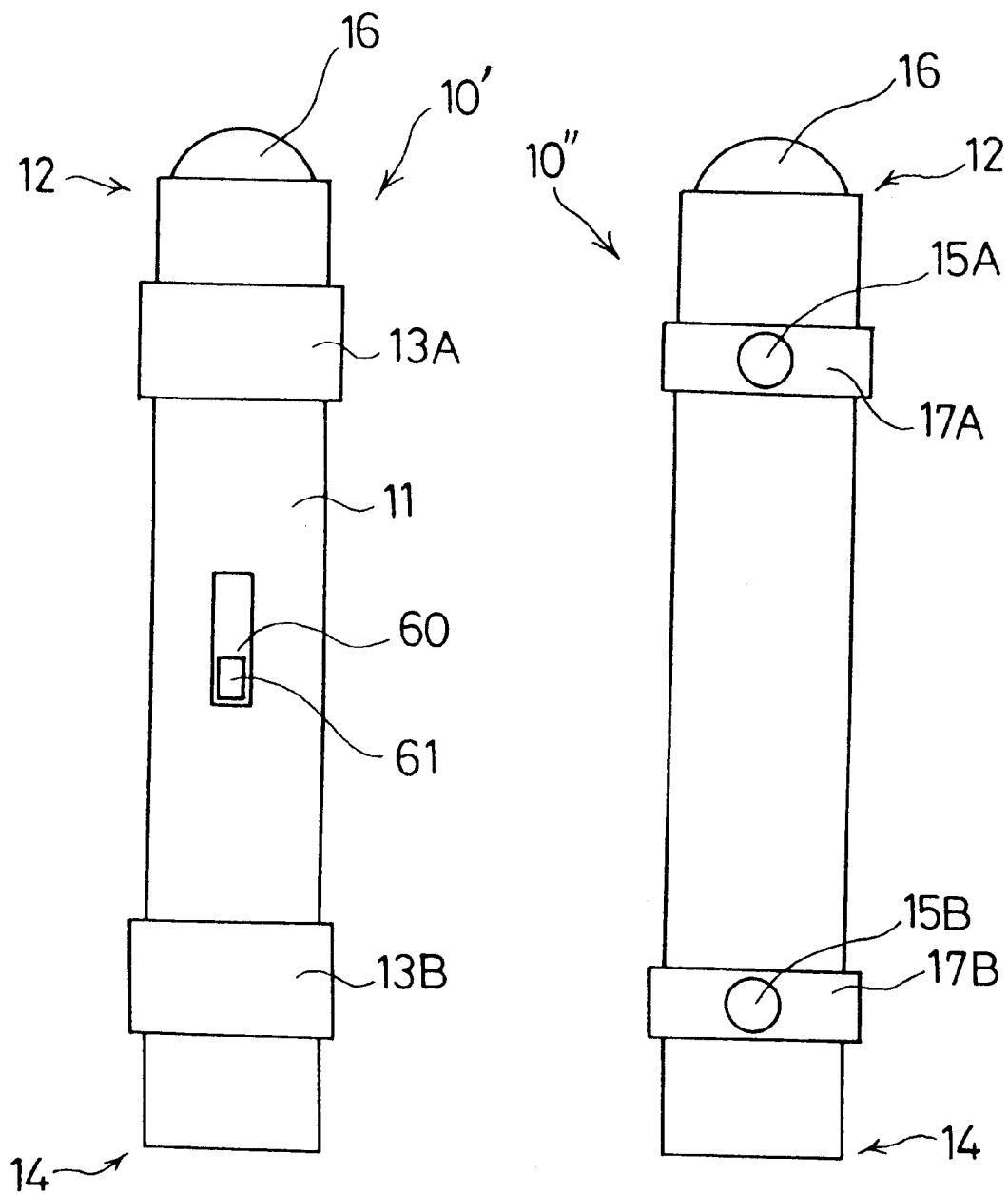

PORTABLE INPUT/OUTPUT DEVICE

BACKGROUND OF THE INVENTION

1. Field of the Invention

The present invention relates to an input/output device that is portable and can be used for inputting and outputting.

2. Description of Related Art

A typical input mechanism is a keyboard. Other simple input devices include a mouse, a track ball, a touchpanel, a tablet and the like. A typical output mechanism is a printer, including desk top types such as an electrophotography system or an ink jet system, or a display device, such as a liquid-crystal display panel.

The conventional keyboard is limited with respect to miniaturization and the input of figures. The mouse has difficulty in inputting characters and can not be used if a flat plane does not exist. The track ball has difficulty in inputting characters and also has a defect in that fine inputting cannot be performed. The touchpanel and the tablet require a large area and are difficult to reduce in size.

Also, regarding output mechanisms, the electrophotography system and the ink jet system in desk top type devices have been developed toward miniaturization but are still inconvenient for carrying. Also, display devices, such as the liquid-crystal display panel, cannot provide a hard copy of the display.

To solve the above-mentioned problems, an electronic pen that functions as an input/output device having a rod or pillar-like external shape and is portable has been provided with an input mechanism and an output mechanism on both ends. However, this electronic pen has a limited external dimension and weight to enable a user to hold it by hand. Consequently, the internal battery for driving must be made small, which is disadvantageous because then the capacity of the battery is small and the time for its continuous use is limited.

SUMMARY OF THE INVENTION

To solve at least the above-mentioned problems in the prior art, a primary object of the embodiments of the present invention is to provide an input/output device that is portable and can be used continuously for a long time.

To attain at least the foregoing object, an input/output device of the present invention has a body frame in a rod or pillar-like shape provided with an input mechanism and an output mechanism respectively on both ends. The device includes a changing device for selecting and changing a circuit system to be supplied with electric power from among a plurality of circuit systems corresponding to the state of the body frame. Consequently, the power supply can be stopped in a circuit system not in use, and unnecessary power is not consumed. Therefore, even if a power supply system with little capacity such as a battery is used, extended use becomes possible.

Also, in the input/output device of the preferred embodiments of the present invention, a plurality of circuit systems are formed by control circuits for the input mechanism and the output mechanism. Consequently, when using the input/output device, since the input work and the output work are performed independently and not simultaneously, the power supply for a circuit system not in use may be stopped. Thus, the electric power can be utilized efficiently.

Further, the changing device is constructed to supply electric power only to a circuit in use among a plurality of circuit systems. Consequently, the device can be used by supplying only the necessary minimum power to the system to utilize the power efficiently.

Preferably, the changing device comprises a slope sensor that detects slope of the body frame to determine the state of the body frame. Thus, the used and unused states of the input mechanism and the output mechanism can be accurately detected without providing a special power source switch. In the preferred embodiment of the input/output device, a tube with mercury sealed therein is used as the slope sensor. Consequently, the power can be supplied only to a circuit necessary for use of the input/output device by a relatively simple circuit system.

Also in the input/output device of the present invention, a transmitting/receiving circuit using infrared rays is provided. Data can be transmitted and received between the transmitting/receiving circuit and a computer or the like provided with (i.e., linked by) an infrared interface or the like. Since connection by a cable is not required, free mobility is ensured and portability of the input/output device can be improved.

BRIEF DESCRIPTION OF THE DRAWINGS

Preferred embodiments of the present invention will be described in detail with reference to the following figures wherein:

FIG. 9 is a schematic side view showing the appearance of an electronic pen according to another embodiment of the invention;

FIG. 10 is a schematic side view showing the appearance of an electronic pen according to a further embodiment of the invention;

DETAILED DESCRIPTION OF PREFERRED EMBODIMENTS

Preferred embodiments of an input/output device of the present invention will be described based on the accompanying drawings as follows.

In this discussion, the input/output device of the present invention is applied to an electronic pen having a pen-like shape. It will be apparent, however, that this invention may be applied in many forms, not restricted to an electronic pen.

Figure 1:
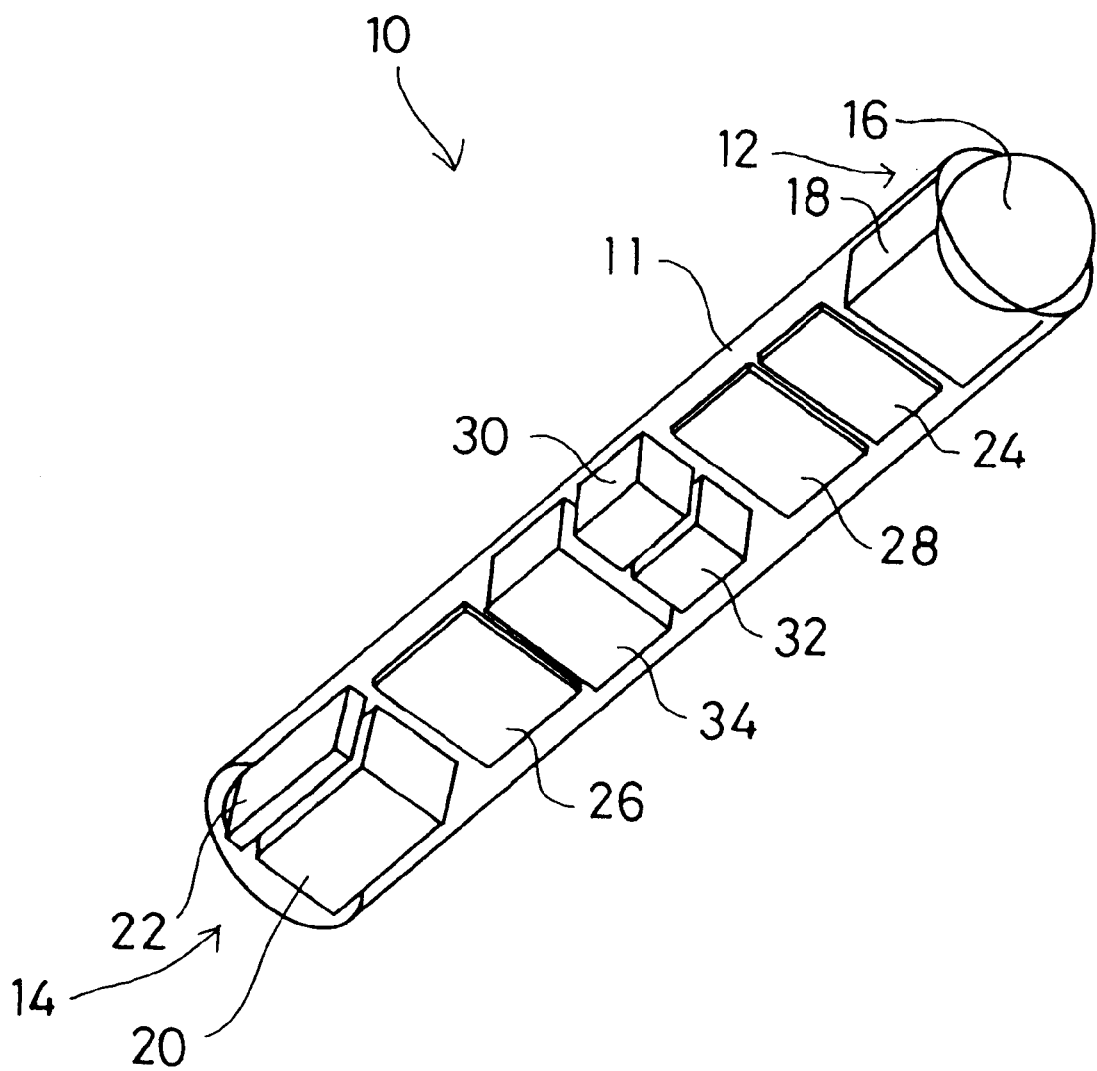
FIG. 1 is a schematic perspective view showing an electronic pen in a preferred embodiment of the invention.
Figure 2:
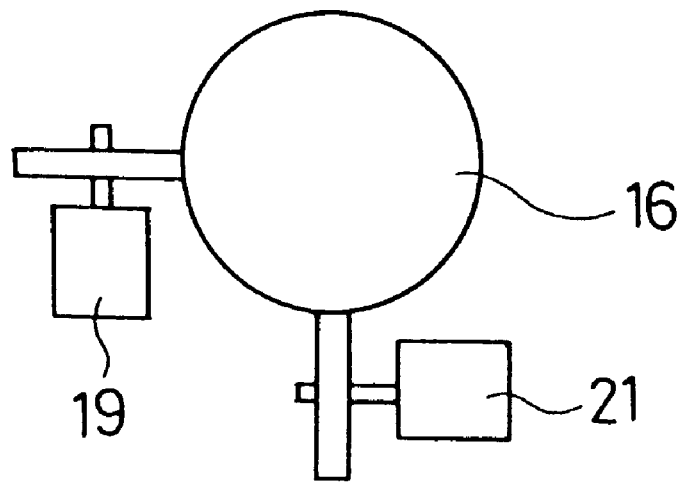
FIG. 2 is a schematic diagram showing an input mechanism of the electronic pen.
Figure 3:
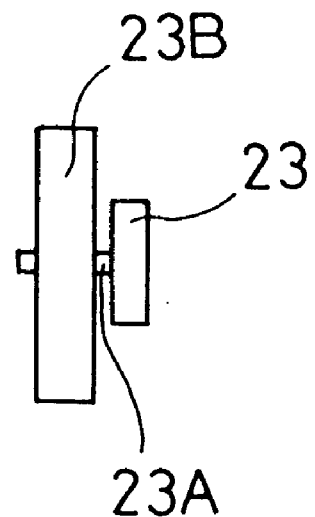
FIG. 3 is a schematic diagram showing a one-dimensional movement detecting mechanism of an output mechanism of the electronic pen.

Referring to FIG. 1, which shows the preferred configuration of an electronic pen 10, the electronic pen 10 comprises a body frame 11 in an elongated rod-like or pillar-like shape so as to have portability. An input mechanism 12 and an output mechanism 14 are provided respectively on each end of the body frame 11. The input mechanism 12 is formed by a ball 16 and a two-dimensional movement detecting mechanism 18. The two-dimensional movement detecting mechanism 18 is constituted by a plurality of rotary encoders 19, 21, as shown in FIG. 2. Also, the output mechanism 14 is constituted by an ink jet printing mechanism 20 and a one-dimensional movement detecting mechanism 22. The one-dimensional movement detecting mechanism 22 is provided with one rotary encoder 23, as shown in FIG. 3. A disk 23B for detecting the movement is mounted on a shaft 23A of the rotary encoder 23.

Figure 4:
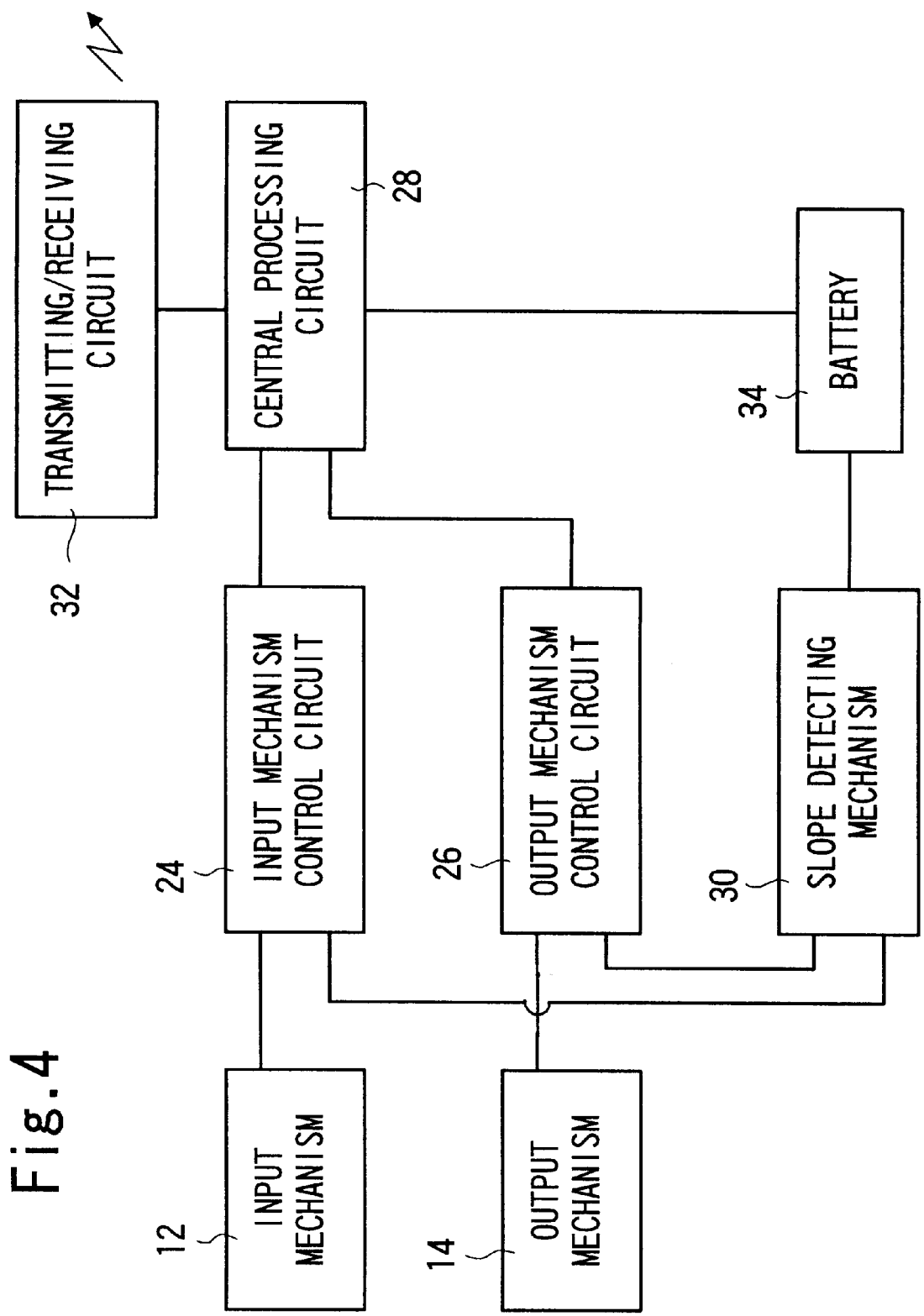
FIG. 4 is a block diagram of a circuit system of the electronic pen.

As shown in FIG. 1 and FIG. 4, the input mechanism 12 is connected to an input mechanism control circuit 24, and the output mechanism 14 is connected to an output mechanism control circuit 26. Further, both the input mechanism control circuit 24 and the output mechanism control circuit 26 are connected to a central processing circuit 28. A battery 34 for supplying power and a transmitting/receiving circuit 32 for transmitting and receiving information with an external source are connected to the central processing circuit 28. The battery 34 is connected through a slope detecting mechanism 30 to the input mechanism control circuit 24 and the output mechanism control circuit 26.

Figure 5:
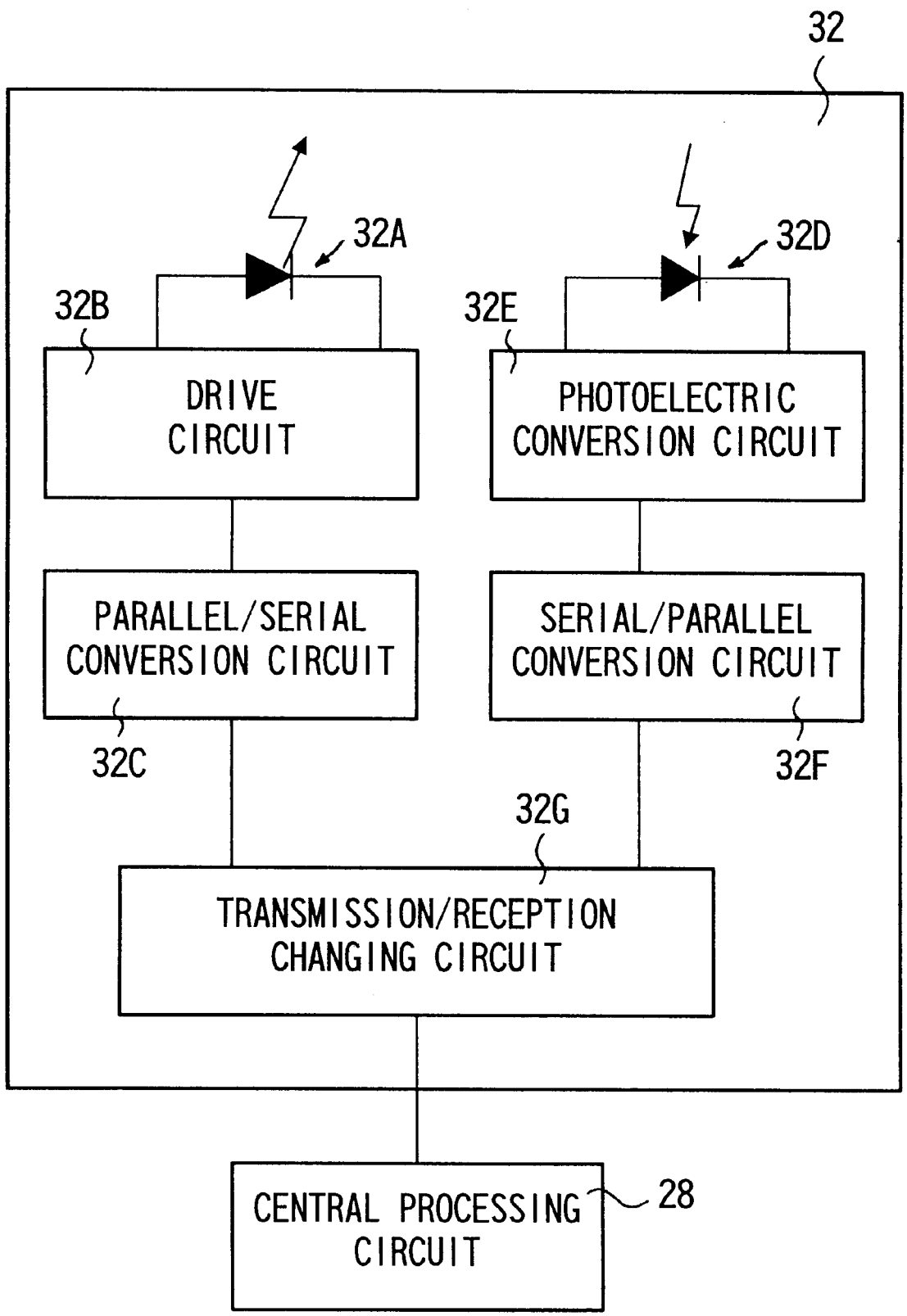
FIG. 5 is a block diagram showing configuration of a transmitting/receiving circuit of the electronic pen.

The transmitting/receiving circuit 32, as shown in FIG. 5, is constituted by an infrared light emission diode 32A, a drive circuit 32B comprising a circuit for driving the infrared light emission diode 32A and a D/A converter, a parallel/serial conversion circuit 32C connected to the drive circuit 32B, a photodiode 32D, a photoelectric conversion circuit 32E comprising an amplifier and an A/D converter for converting outputs of the photodiode 32D into digital signals, a serial/parallel conversion circuit 32F for converting outputs of the photoelectric conversion circuit 32E into parallel signals, and a data transmission/reception changing circuit 32G connected to the central processing circuit 28 for changing transmission/reception of data.

Next, operation of the electronic pen 10 in this embodiment will be described.

First, when inputting is performed using the electronic pen 10 of this embodiment, a user uses the electronic pen 10 with the input mechanism 12 on the lower side with respect to output mechanism 14. Then, power is supplied from the battery 34 only to the input mechanism control circuit 24 and the central processing circuit 28 by the slope detecting mechanism 30 described later. Subsequently, characters or figures are input onto a solid body or support medium such as paper using the input mechanism 12.

When the user holds the body frame 11 of the electronic pen 10 with the side of the input mechanism 12 directed to the lower side, characters or figures are drawn onto a solid body such as paper such that the ball 16 contacts the solid body. A two-dimensional movement is detected through the ball 16 by the rotary encoders 19, 21 of the two-dimensional movement detecting mechanism 18. Pulse outputs of the rotary encoders 19, 21 are made into digital data in two-axis directions by the input mechanism control circuit 24 and sent as electric signals to the central processing circuit 28. Then, inputting as figures or recognition of characters is performed.

Then, the central processing circuit 28 examines output from the output mechanism control circuit 26 to the central processing circuit 28. Since power is not supplied from the battery 34 to the output mechanism control circuit 26, the output is in a high impedance state. Consequently, the central processing circuit 28 determines that the output mechanism control circuit 26 is in the unused state. Therefore, the central processing circuit 28 does not output printing data to the output mechanism control circuit 26, and printing data is not lost before being printed.

Outputting is performed using the electronic pen 10 when the user uses the electronic pen 10 with the output mechanism 14 on the lower side with respect to the input mechanism 12. Then, by the slope detecting mechanism 30 as described later, power is supplied from the battery 34 only to the output mechanism control circuit 26 and the central processing circuit 28.

When using the output mechanism 14, if sweeping is performed on a medium to be printed, such as paper, in a closely contacting state, the movement is sent as pulse signals from the rotary encoder 23 of the one-dimensional movement detecting mechanism 22 to the output mechanism control circuit 26. In the output mechanism control circuit 26, pulses from the rotary encoder 23 are counted, and the movement is sent as digital data to the central processing circuit 28. In the central processing circuit 28, a printing position is calculated from the one-dimensional movement, and one-dimensional printing data corresponding to the printing position are sent to the output mechanism control circuit 26. In the output mechanism control circuit 26, the one-dimensional printing data is converted into control signals of the ink jet printing mechanism 20. Then, the ink jet printing mechanism 20 is driven, and printing is performed.

The central processing circuit 28 examines output from the input mechanism control circuit 24 to the central processing circuit 28, since power is not supplied from the battery 34 to the input mechanism control circuit 24, the output is in a high impedance state. The central processing circuit 28 then determines that the input mechanism control circuit 24 is in the unused state. Consequently, the central processing circuit 28 does not transmit useless control signals or the like to the input mechanism control circuit 24.

Figure 6:
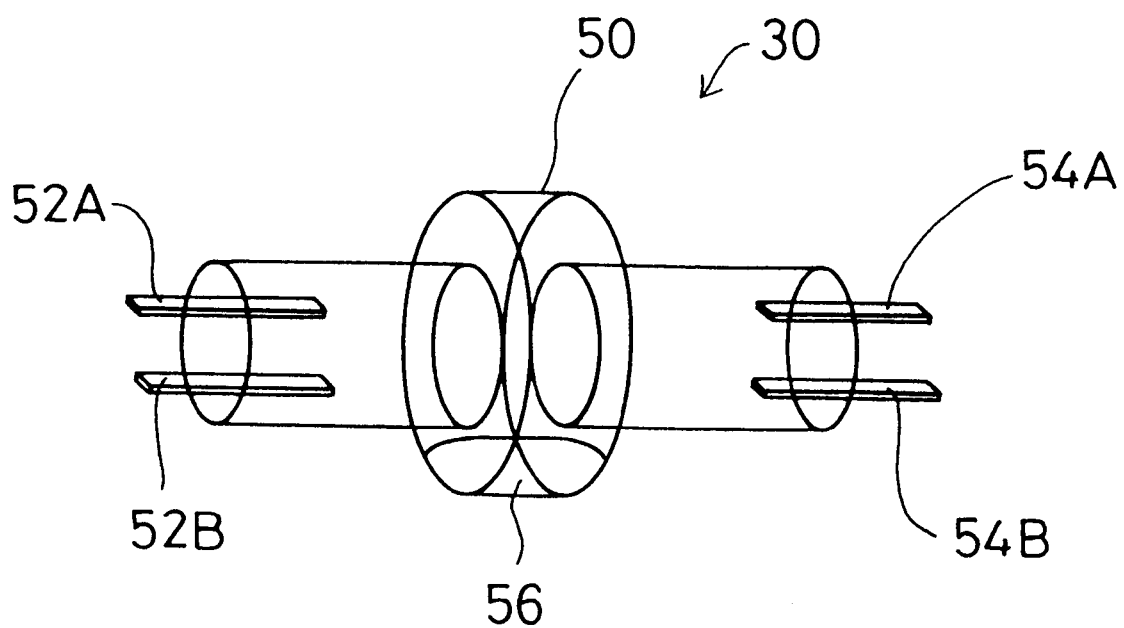
FIG. 6 is a schematic perspective side view showing structure of a slope detecting mechanism to be used in the electronic pen.

Next, the preferred configuration of the slope detecting mechanism 30 will be described. As shown in FIG. 6, in the slope detecting mechanism 30, two sets of electrodes 52A, 52B and 54A, 54B are sealed in a cylindrical glass tube 50 having an inner diameter widened at the axial center. The ends of the electrodes 52A, 52B and 54A, 54B are exposed respectively to the inside of the glass tube 50. A flowable conductive substance with a relatively large surface tension, such as mercury 56, is sealed in the glass tube 50. Operation of the slope detecting mechanism 30 will be described with reference to FIG. 7A to FIG. 7C.

Figure 7:
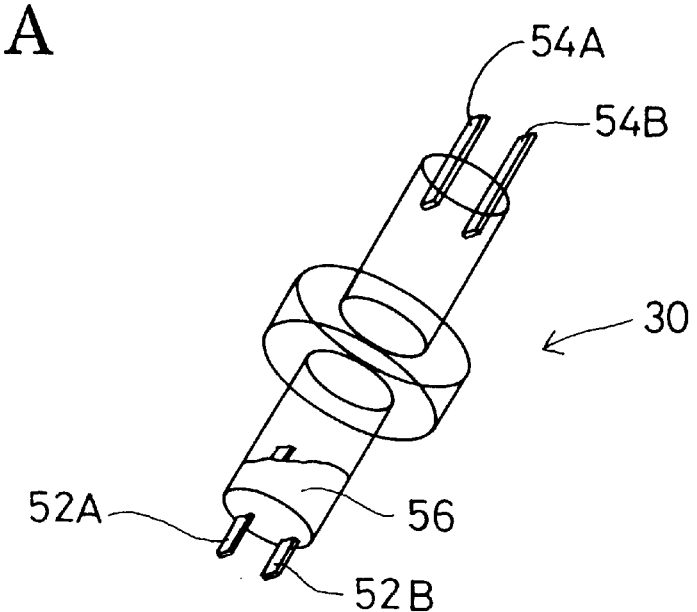
FIG. 7A is a schematic perspective side view showing the slope detecting mechanism in the state that the left end is lowered.
FIG. 7B is a schematic perspective side view showing the slope detecting mechanism in the horizontal state.
FIG. 7C is a schematic perspective side view showing the slope detecting mechanism in the state that the right end is lowered.
Figure 7:
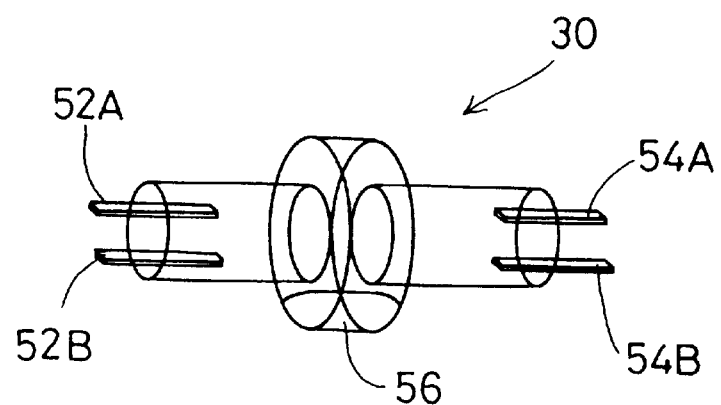
Figure 7:
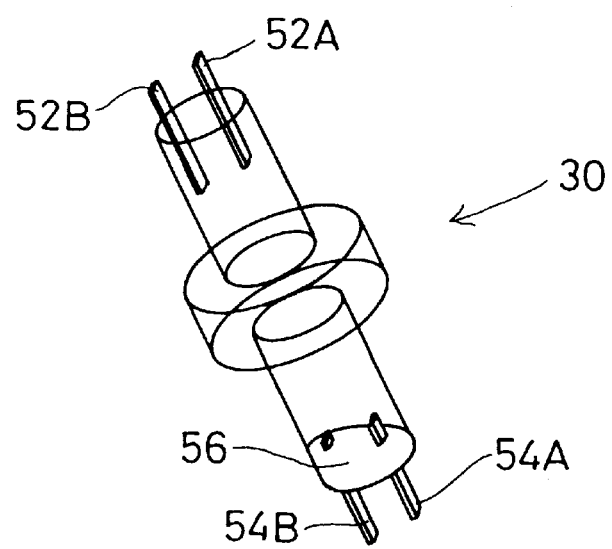

First, as shown in FIG. 7A, when the left end of the slope detecting mechanism 30 is lowered, the mercury 56 contacts with the electrodes 52A, 52B at the left end, and the electrodes 52A, 52B at the left end are electrically connected. Since mercury has a relatively large surface tension, all of the mercury 56 collects at the lower left end as seen in FIG. 7A. Mercury 56 does not remain in the area of electrodes 54A, 54B at the right end, and, thus, the electrodes at the right end are not electrically connected.

As shown in FIG. 7B, when the slope detecting mechanism 30 is oriented horizontally, the mercury 56 gathers in the axial center portion with the inner diameter widened, which forms a storage well. The electrodes 52A, 52B at the left end and the electrodes 54A, 54B at the right end are not electrically connected.

Further, as shown in FIG. 7C, when the right end of the slope detecting mechanism 30 is tilted or lowered, the mercury 56 collects at the bottom and contacts with the electrodes 54A, 54B at the right end. Therefore, the electrodes 54A, 54B at the right end are electrically connected, and the electrodes 52A, 52B at the left end are not electrically connected.

Consequently, the slope detecting mechanism 30 constitutes a changing device or a slope sensor in the present invention. The mercury 56 selectively makes an electrical connection between electrodes 52A and 52B or electrodes 54A and 54B depending on the orientation of the device.

Figure 8:
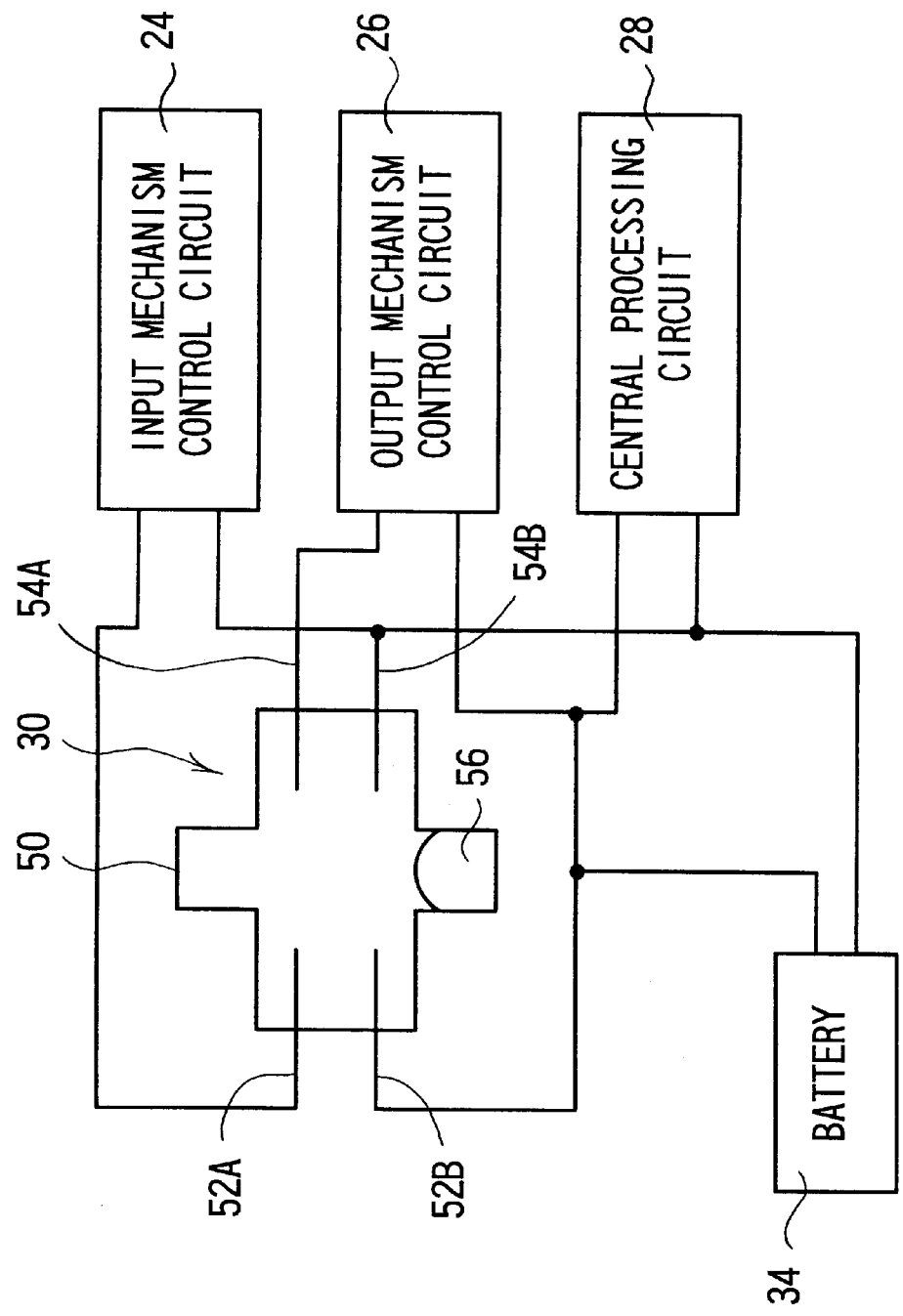
FIG. 8 is a diagram showing the electric connection state between the slope detecting mechanism and the circuit system.

Referring to FIG. 8, operation of changing the power supply of the circuit system by the operation of the slope detecting mechanism 30 will be described. Electric power of the input mechanism control circuit 24 and the output mechanism control circuit 26 is supplied from the battery 34 through the slope detecting mechanism 30 as seen in FIG. 4. If the user holds the electronic pen 10 in the state that the input mechanism 12 of the electronic pen 10 is lowered, the left end of the slope detecting mechanism 30 is lowered. Accordingly, the electrodes 52A, 52B at the left end of the slope detecting mechanism 30 are electrically connected by the mercury 56, and power is supplied from the battery 34 to the input mechanism control circuit 24. On the other hand, if the user holds the electronic pen 10 in the state that the output mechanism 14 of the electric pen 10 is lowered, the right end of the slope detecting mechanism 30 is lowered. Accordingly, the electrodes 54A, 54B at the right end are electrically connected, and power is supplied from the battery 34 to the output mechanism control circuit 26.

When the electronic pen 10 is in the horizontal state, none of the electrodes 52A, 52B and 54A, 54B on either end of the slope detecting mechanism 30 are electrically connected because the mercury 56 is in the well of the slope detecting mechanism 30. So, power is not supplied to either the input mechanism control circuit 24 or the output mechanism control circuit 26. On the other hand, power is always supplied to the central processing circuit 28. However, since the central processing circuit 28 is constituted by an electronic circuit only and does not have a drive mechanism, the consumption of power is small.

Since the electronic pen 10 in this embodiment is provided with a transmitting/receiving circuit 32 using infrared rays as shown in FIG. 1 or FIG. 4, data can be transmitted and received between the transmitting/receiving circuit 32 and a personal computer or the like provided with an infrared communication interface. Consequently, data such as characters or figures inputted using the input mechanism 12 of the electronic pen 10 of this embodiment are transmitted from the transmitting/receiving circuit 32 using infrared rays to an external information device, such as a personal computer. Also, printing data or the like that is transmitted from the external information device using infrared rays is received by the transmitting/receiving circuit 32 of the electronic pen 10 in this embodiment, passed through the central processing circuit 28 and the output mechanism control circuit 26 and are printed by the ink jet printing mechanism 20 of the output mechanism 14. Consequently, information can be transmitted and received between the electronic pen 10 and an external device by a wireless system.

In addition, various modifications within scope of the idea of the present invention may be done based on the known technology or the obvious technology to those skilled in the art.

The input mechanism 12 and the output mechanism 14 are not limited to the types described in this embodiment. For example, an image reading mechanism by CCD or the like may be used as an input mechanism. Also, a thermal transfer system or the like may be used, of course, as an output mechanism.

Further, the slope detecting mechanism 30 may not only be embodied by a system where mercury is sealed in a glass tube as shown but may also take the form of any system that is capable of detecting the slope of a body frame 11 or the holding state of a user.

Specifically, in this embodiment, although the slope detecting mechanism 30 is used to detect the state of the body frame 11, a pressure sensor or a temperature sensor may be used to detect which side of the electronic pen 10 is held by the user, e.g., the side of the input mechanism 12 or the side of the output mechanism 14.

Figure 11:
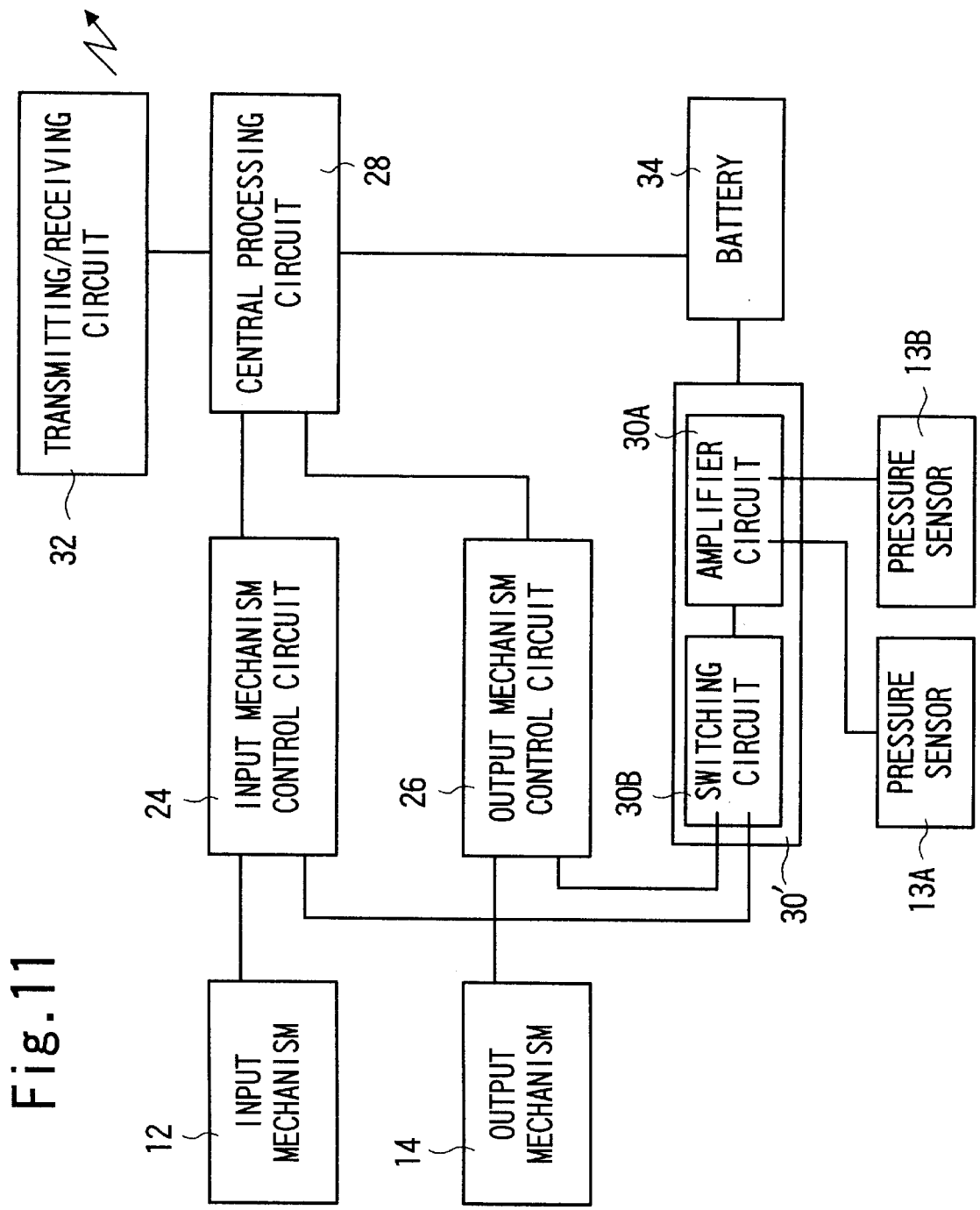
FIG. 11 is a block diagram of a circuit system of the electronic pen according to the embodiment shown in FIG. 9.

For example, as shown in FIG. 9 and FIG. 10, pressure sensors 13A, 13B or temperature sensors 15A, 15B are provided respectively at portions held by the user on the body frame 11 of the electronic pen 10' and 10". When the user uses the input mechanism 12 of the electronic pen 10', since the pressure sensor 13A is held, the pressure sensor 13A detects the holding pressure. Also, when the user uses the output mechanism 14 of the electronic pen 10', since the part of the pressure sensor 13B is held, the pressure sensor 13B detects the holding pressure. In this case, as shown in FIG. 11, the slope detecting mechanism 30' may be formed as an amplifier circuit 30A amplifying detected outputs of the pressure sensors 13A, 13B, and a switching circuit 30B supplying power from the battery 34 to the input mechanism control circuit 24 in the case of output from the pressure sensor 13A and supplying power from the battery 34 to the output mechanism control circuit 26 in the case of output from the pressure sensor 13B.

Also, when the temperature sensors 15A, 15B are used, heat conduction plates 17A, 17B made of aluminum for heat conduction are wound round each of the temperature sensors 15A, 15B on the cylindrical body frame 11. The annular heat conduction plates 17A, 17B can securely conduct heat of hands of the user to the temperature sensors 15A, 15B. Consequently, when the user uses the input mechanism 12 of the electronic pen 10", since the part of the heat conduction plate 17A is held, the temperature sensor 15A can detect the heat of hands. Also, when the user uses the output mechanism 14 of the electronic pen 10", since the part of the heat conduction plate 17B is held, the temperature sensor 15B can detect the heat of hands.

Figure 12:
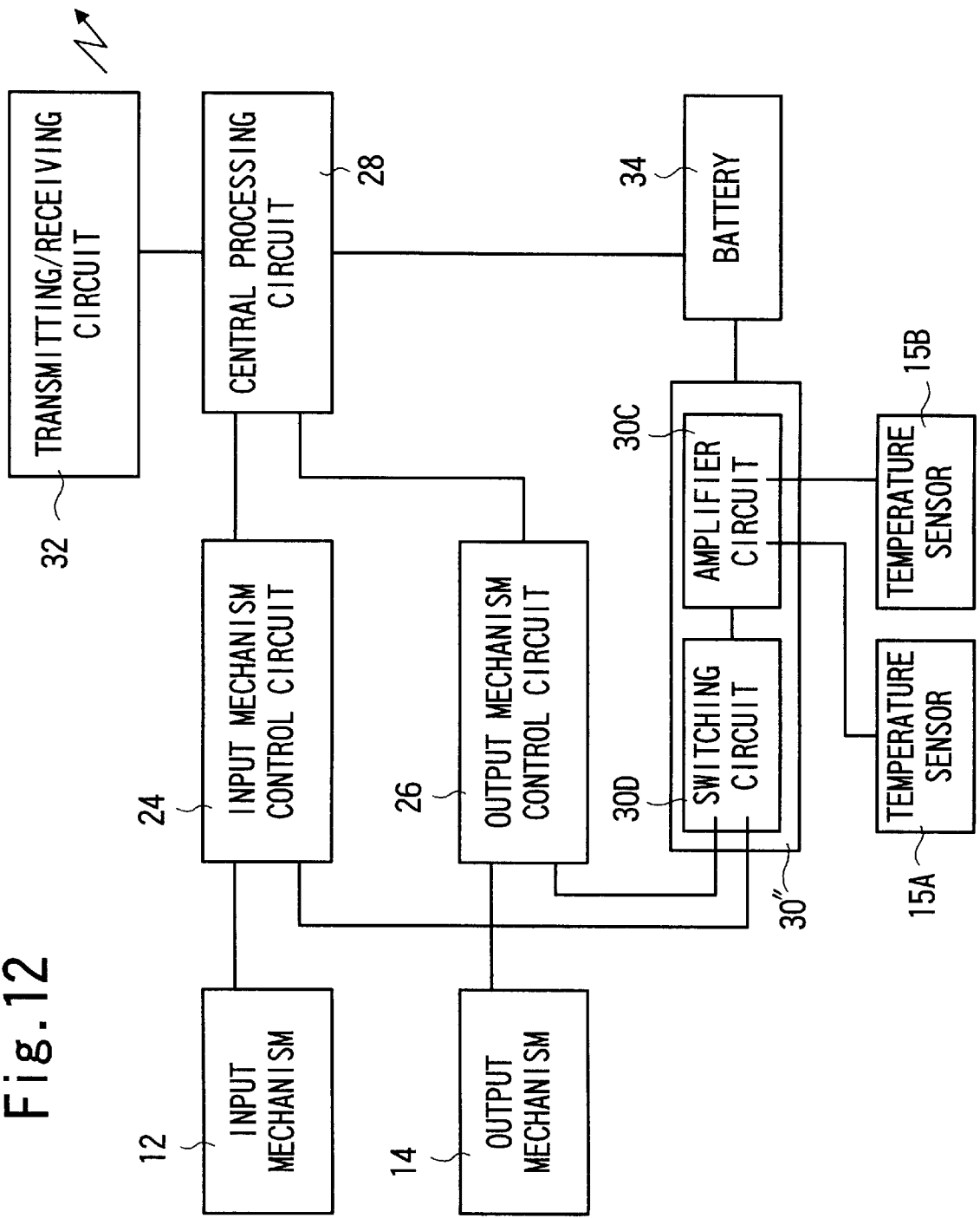
FIG. 12 is a block diagram of a circuit system of the electronic pen according to the embodiment shown in FIG. 10.

In addition, when the temperature sensors 15A, 15B are used, as shown in FIG. 12, the slope detecting mechanism 30' may be formed as an amplifier circuit 30C amplifying detected outputs of the temperature sensors 15A, 15B, and a switching circuit 30D supplying power from the battery 34 to the input mechanism control circuit 24 in the case of output from the temperature sensor 15A and supplying power from the battery 34 to the output mechanism control circuit 26 in the case of output from the temperature sensor 15B.

Figure 13:
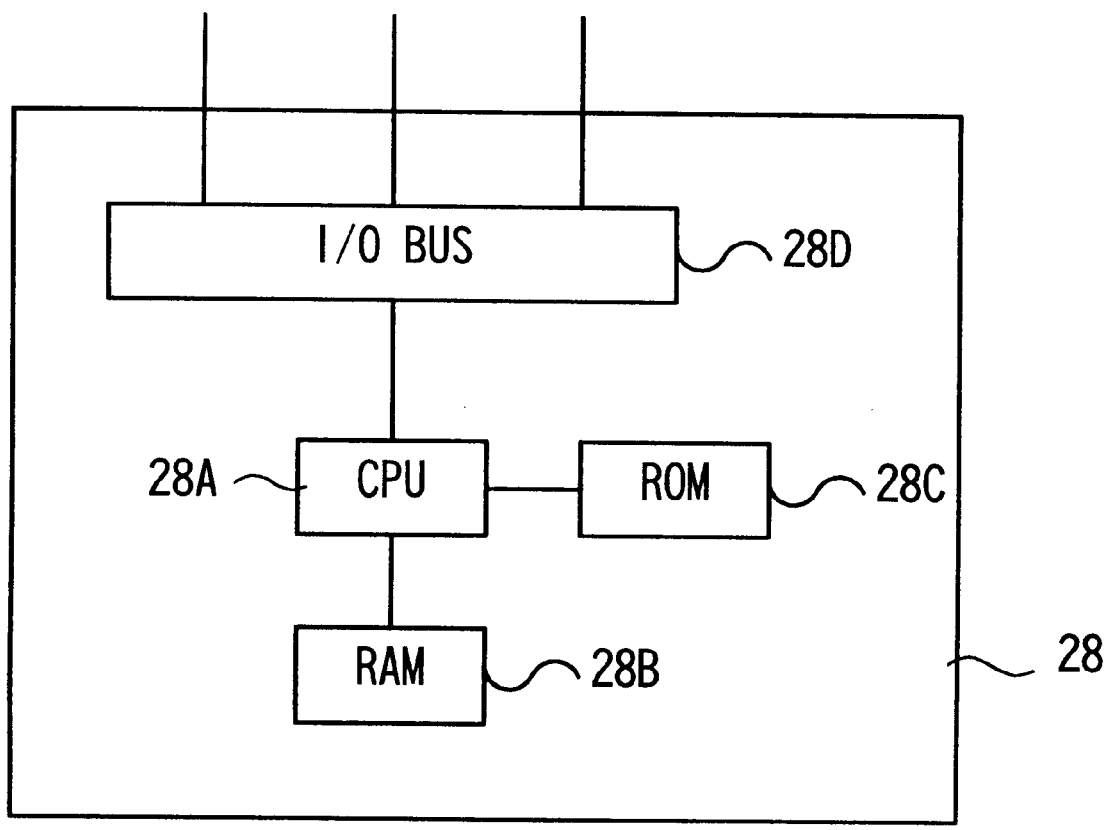
FIG. 13 is a block diagram showing an example of a central processing circuit of an electronic pen in another embodiment of the invention.

Further, the central processing circuit 28 of the electronic pen 10 may be formed as a hard logic circuit or any suitable processing device. As shown in FIG. 13, it may also be constituted by a CPU 28A, a RAM 28B storing printing data or the like, a ROM 28C storing a control program of the electronic pen 10, and an I/O bus 28D. In this case, the input mechanism control circuit 24, the output mechanism control circuit 26 and the transmitting/receiving circuit 32 are connected to the I/O bus 28D.

Further, in the electronic pen 10' shown in FIG. 9, a switch 60 may be optionally provided on the body frame 11 and inputting of power of the battery 34 to the input mechanism control circuit 24 and the output mechanism control circuit 26 may be changed by manual operation. Such a switch 60 may be used alone or with any of the disclosed embodiments.

Changing of the power inputting by manual operation will be described with reference to FIG. 9, FIG. 14 and FIG. 15.

Figure 14:
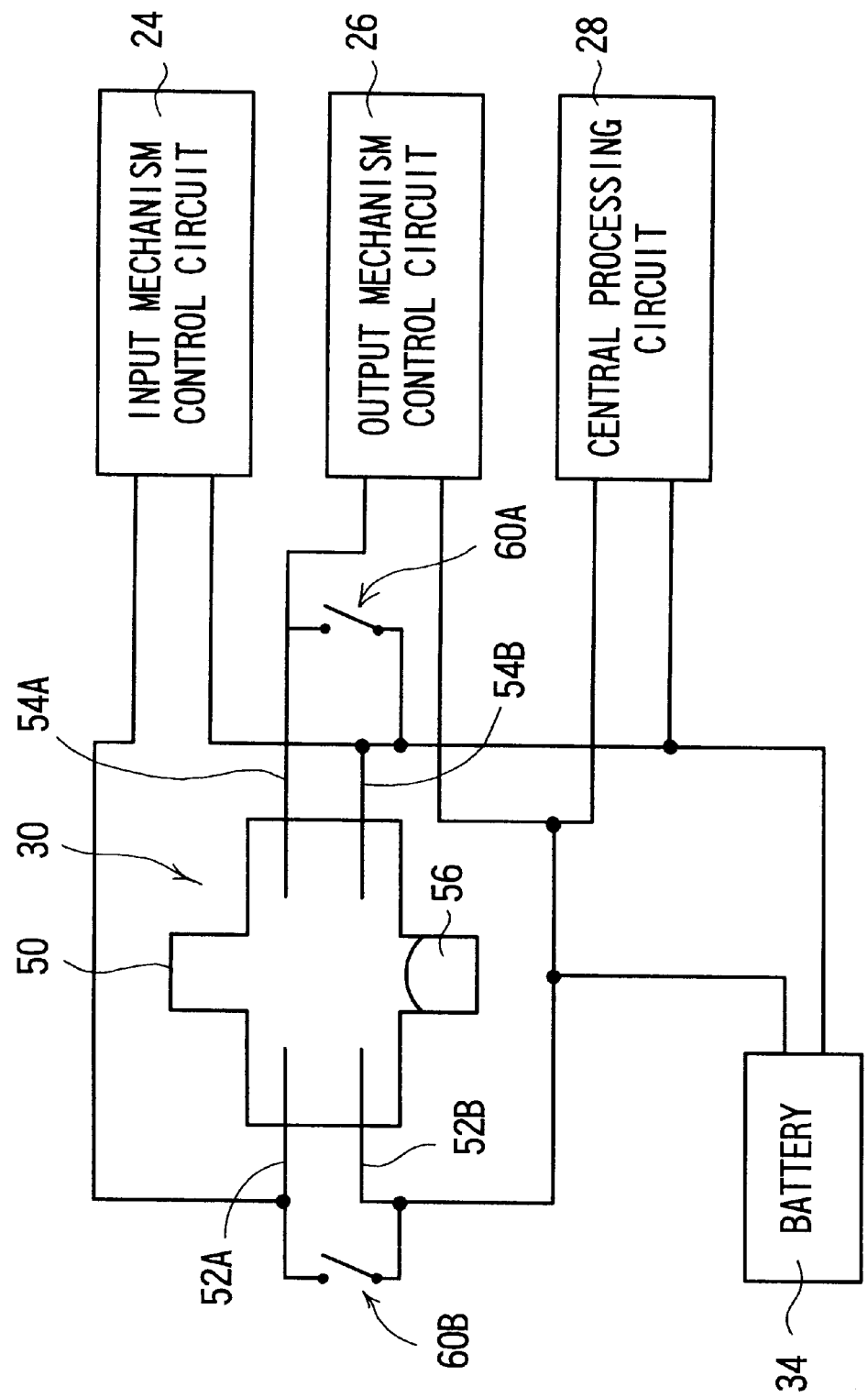
FIG. 14 is a block diagram of a circuit system of an electronic pen in another embodiment of the invention.
Figure 15:
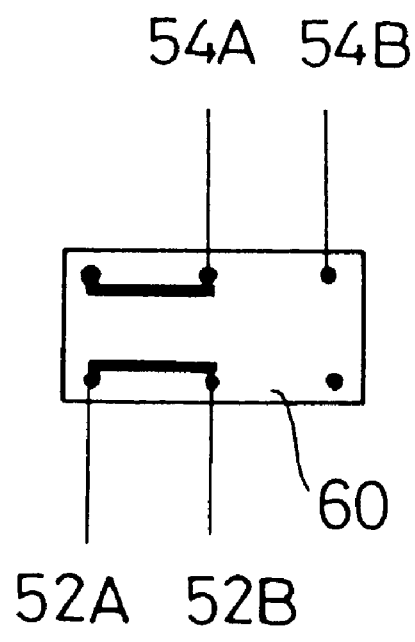
FIG. 15A is a schematic diagram showing the switching state of a switch of the electronic pen in the embodiment shown in FIG. 14.
FIG. 15B is a schematic diagram showing another switching state of the switch of the electronic pen in the embodiment shown in FIG. 14.
Figure 15:
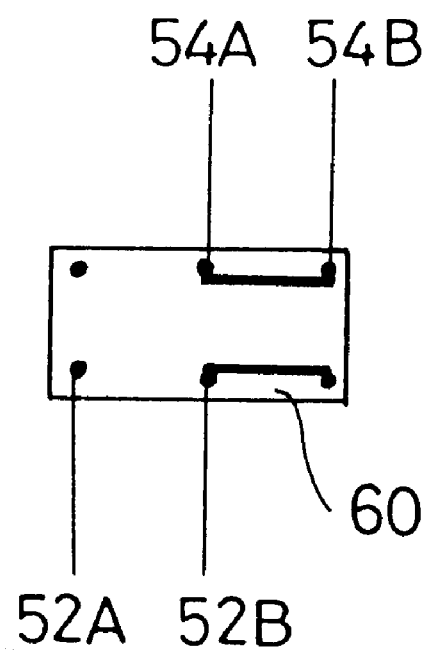

When the output mechanism 14 is used, if a slider 61 of the switch 60 as shown in FIG. 9 is moved to the side of the output mechanism 14, contacts 60A of the switch 60 as shown in FIG. 14 are closed, and the power of the battery 34 is supplied to the output mechanism control circuit 26. Then, contacts of the switch 60 are in the state shown in FIG. 15A.

Next, when the input mechanism 12 is used, if the slider 61 of the switch 60 as shown in FIG. 9 is moved to the side of the input mechanism 12, contacts 60B of the switch 60 as shown in FIG. 14 are closed, and the power of the battery 34 is supplied to the input mechanism control circuit 24. Then, contacts of the switch 60 are in the state shown in FIG. 15B.

When the switch 60 is provided on the body frame 11 of the electronic pen 10, since changing of inputting of the power by manual operation becomes possible, regardless of the state of the mercury 56, the power from the battery 34 can be definitely inputted to the input mechanism control circuit 24 or the output mechanism control circuit 26.

In this invention, although the body frame is in cylindrical shape, it may be any suitable shape including an elliptic cylinder or a square pillar with triangular, pentagonal or hexagonal cross section.

What is claimed is:

1. An input/output device capable of inputting data to and outputting data from a linked external device, comprising:
    a body frame having two opposed ends;
    a plurality of circuit systems provided within the body frame selectively coupled to a power source;
    an input mechanism provided on the body frame and coupled to one of the circuit systems, the input mechanism generating input data for input to the external device;
    an image recording device provided on the body frame and coupled to one of the circuit systems, the image recording device receiving output data from the external device and outputting the output data onto a medium; and
    a changing device for selecting and changing a circuit system to be supplied with power from the power source from among the plurality of circuit systems based on a state of use of the body frame.

2. The input/output device of claim 1, wherein the changing device comprises a slope sensor for detecting slope of the body frame to determine the state of use of the body frame and which circuit system will be supplied with power.

3. The input/output device of claim 2, wherein the slope sensor comprises a tube with mercury sealed therein, the mercury making selective electrical connection to the circuit system coupled to the mechanism in use.

4. The input/output device of claim 1, wherein the changing device comprises a pressure sensor device provided on the body frame to detect the state of use of the body frame.

5. The input/output device of claim 1, wherein the changing device comprises a temperature sensor device provided on the body frame to detect the state of use of the body frame.

6. The input/output device of claim 1, wherein the body frame is provided with a transmitting/receiving circuit for transmitting the input data to and receiving the output data from the external device.

7. The input/output device of claim 1, wherein the body frame is provided with a changeover switch for manually determining which circuit system is to be supplied with power from the power source.

8. A hand held input/output device capable of inputting data to and outputting data from a linked external device and having with a first end and a second end, comprising:
    input means for generating input data disposed on the first end;
    image recording means for receiving output data disposed on the second end, the image recording means being capable of outputting the output data onto a medium;
    control means coupled to the input means and the image recording means for controlling input, output and transfer of data;
    power means for providing power coupled to the input means, the image recording means and the control means; and
    power connecting means for selectively connecting power to one of the input means and the image recording means.

9. The hand held input/output device of claim 8 wherein the power connecting means operates to connect power to the input means and the image recording means based on which end of the device an operator is handling.

10. The hand held input/output device of claim 8 wherein the power connecting means comprises a slope detecting mechanism that operates based on which end of the device is pointed downward.

11. The hand held input/output device of claim 10 wherein the slope detecting mechanism comprises a sealed hollow tube having a first end with a first pair of electrodes extending through the first end, a second end with a second pair of electrodes extending through the second end, and an enlarged diameter central portion forming a storage well, and mercury contained within the hollow tube,
    wherein when the device is held such that the first end of the device is lowered, the mercury collects around the fist pair of electrodes forming an electrical connection and providing power to the input means,
    wherein when the second end of the device is lowered, the mercury collects around the second pair of electrodes forming an electrical connection and providing power to the output means, and wherein when the device is relatively horizontal, the mercury collects in the storage well forming no electrical connection and providing power to neither the input means nor the image recording means.

12. The hand held input/output device of claim 8 wherein the power connecting means comprises a pressure sensor device disposed near each end of the device to sense which end of the device is experiencing pressure when an operator holds the device.

13. The hand held input/output device of claim 8 wherein the power connecting means comprises a temperature sensor device disposed near each end of the device to sense which end of the device is experiencing a change in temperature when an operator holds the device.

14. The hand held input/output device of claim 8 wherein the power connecting means comprises an electrical switch that is manually operated to form an electrical connection between the power means and one of the input means and the image recording means.

15. The hand held input/output device of claim 8 wherein the input means comprises an input mechanism and an input mechanism control circuit, and wherein the image recording means comprises an image recording mechanism and an image recording mechanism control circuit, wherein the power connecting means selectively forms an electrical connection with one of the input mechanism control circuit and the image recording mechanism control circuit.

16. The hand held input/output device of claim 15 wherein the input mechanism comprises a movable ball and a two-dimensional movement detecting mechanism coupled thereto.

17. The hand held input/output device of claim 15 wherein the image recording mechanism comprises an ink jet printed and a one dimensional movement detecting mechanism coupled thereto.

18. The hand held input/output device of claim 8 further comprising transmitting and receiving means for transmitting the input data to and receiving the output data from the external device, wherein the transmitting and receiving means comprises an infrared light emission diode and a transmitting and receiving circuit coupled to the control means.

19. A method of selectively supplying power to individual circuit systems within a hand held input/output device having an input mechanism for generating input data for input to an external device, an image recording device for receiving output data from the external device and for outputting the output data onto a medium, and an internal power source, based on whether the input mechanism or the image recording device is being used, comprising the steps of:

operating the input/output device by orienting one of the input mechanism and the image recording device for operation;

automatically detecting which mechanism is being operated; and supplying power to only the mechanism being operated.

20. The method of claim 19 wherein the step of automatically detecting which mechanism is being operated includes sensing which end of the device is being grasped by an operator by using a sensor selected from the group consisting of a slope sensor, a pressure sensor and a temperature sensor.

21. The input/output device of claim 1, wherein the input/output device is wirelessly linked with the external device.

22. The input/output device of claim 3, wherein the slope sensor includes a sealed hollow tube having a first end with a first pair of electrodes extending through the first end, a second end with a second pair of electrodes extending through the second end, and an enlarged diameter central portion forming a storage well, and mercury contained within the hollow tube, wherein when the device is held such that the first end of the device is lowered, the mercury collects around the first pair of electrodes forming an electrical connection and providing power to the input means, wherein when the second end of the device is lowered, the mercury collects around the second pair of electrodes forming an electrical connection and providing power to the output means, and wherein when the device is relatively horizontal, the mercury collects in the storage well forming no electrical connection and providing power to neither the input means nor the output means.

23. The input/out device of claim 1, wherein the image recording mechanism comprises an ink jet printer and a one dimensional movement detecting mechanism coupled thereto.

24. The input/output device of claim 1, wherein the body frame is elongated and has a rod-like shape.

25. The input/output device of claim 1, further comprising a power source provided within the body frame.

\* \* \* \* \*